(12) United States Patent
Bi et al.

(10) Patent No.: US 12,309,044 B1
(45) Date of Patent: May 20, 2025

(54) IDENTIFYING APPLICATION AND TRANSPORT LAYERS DISCREPANCIES

(71) Applicant: Zoom Communications, Inc., San Jose, CA (US)

(72) Inventors: Dezhi Bi, Hangzhou (CN); Yuanyuan Du, Hangzhou (CN); Xiaohuan Pan, Hangzhou (CN); Jingjin Xie, Hangzhou (CN)

(73) Assignee: Zoom Communications, Inc., San Jose, CA (US)

( * ) Notice: Subject to any disclaimer, the term of this patent is extended or adjusted under 35 U.S.C. 154(b) by 2 days.

(21) Appl. No.: 18/416,292

(22) Filed: Jan. 18, 2024

(51) Int. Cl.
*H04L 43/04* (2022.01)
*H04L 43/10* (2022.01)

(52) U.S. Cl.
CPC .............. *H04L 43/04* (2013.01); *H04L 43/10* (2013.01)

(58) Field of Classification Search
None
See application file for complete search history.

(56) References Cited

U.S. PATENT DOCUMENTS

| | | | |
|---|---|---|---|
| 7,395,458 B2 | 7/2008 | Shrivastava et al. | |
| 9,571,354 B2 | 2/2017 | Annamalaisami et al. | |
| 10,013,331 B2 | 7/2018 | Brodsky et al. | |
| 10,721,270 B2 | 7/2020 | Reddy et al. | |
| 11,023,607 B1* | 6/2021 | Mantin | G06F 21/554 |
| 2010/0098085 A1* | 4/2010 | Wu | H04L 45/22 370/392 |
| 2021/0136042 A1* | 5/2021 | Wang | H04L 67/12 |

OTHER PUBLICATIONS

Stack Overflow, Transport layer Services and Application Layer services, https://stackoverflow.com/questions/27613589/transport-layer-services-and-application-layer-services, John Saunders, Dec. 23, 2024, 5 pages.

Stack Overflow, Log all requests from the python-requests module, https://stackoverflow.com/questions/16337511/log-all-requests-from-the-python-requests-module, VVVVV, Mar. 24, 2023, 14 pages.

* cited by examiner

*Primary Examiner* — Quang N Nguyen
(74) *Attorney, Agent, or Firm* — Young Basile Hanlon & MacFarlane, P.C.

(57) ABSTRACT

First data related to outbound transport layer requests from a software application to external systems are logged. Second data related to application services layer requests from the software application are logged to at least some of the external systems. A transport layer request of the outbound transport layer requests that does not correspond to an application services layer request of the application services layer requests is identified based on the first data and the second data. The first data can include stack traces associated with the outbound transport layer requests. Logging the first data can be performed by an agent injected into classes including java.net. Socket and java.net. DatagramSocket executable by the software application.

18 Claims, 9 Drawing Sheets

```
1.  class PressAgent {
2.      function premain(agentArgs, instrumentation) {
3.          instrumentation.addTransformer(new PressClassFileTransformer())
4.      }
5.  }

6.  class PressClassFileTransformer implements ClassFileTransformer {
7.      set FILTER_CLASSES = ["java.net.Socket", "java.net.DatagramSocket"]
8.      constant FILTER_METHOD_SOCKET = "getOutputStream"
9.      constant FILTER_METHOD_DATAGRAMSOCKET = "send"

10.     function transform(loader, className, classBeingRedefined, protectionDomain, classfileBuffer) {
11.         try {
12.             normalizedClassName = replaceAll(className, "/", ".")
13.             if FILTER_CLASSES contains normalizedClassName {
14.                 classPool = getClassPool(loader)
15.                 ctClass = classPool.get(className)

16.                 if className equals FILTER_CLASS_SOCKET {
17.                     ctMethod = ctClass.getDeclaredMethod(FILTER_METHOD_SOCKET)
18.                     ctMethod.insertBefore("...") // Inject interception and logging logic here
19.                 }
20.                 if className equals FILTER_CLASS_DATAGRAMSOCKET {
21.                     ctMethod = ctClass.getDeclaredMethod(FILTER_METHOD_DATAGRAMSOCKET)
22.                     ctMethod.insertBefore("...") // Inject interception and logging logic here
23.                 }

24.                 return ctClass.toBytecode()
25.             }
26.         } catch Exception {
27.             // Handle exception
28.         }
29.         return classfileBuffer
30.     }

31.     function getClassPool(loader) {
32.         pool = new ClassPool()
33.         pool.appendClassPath(new LoaderClassPath(loader))
34.         return pool
35.     }
36. }
```

FIG. 6

```
1.  class PressAgent {
2.     function premain(agentArgs, instrumentation) {
3.         instrumentation.addTransformer(new PressClassFileTransformer())
4.     }
5.  }

6.  class PressClassFileTransformer implements ClassFileTransformer {
7.     set FILTER_CLASSES = ["com.acme.druid.pool.DruidPooledConnection",
"com.acme.druid.pool.DruidPooledStatement"]
8.     set FILTER_METHODS = ["prepareStatement", "prepareCall"]

9.     function transform(loader, className, classBeingRedefined, protectionDomain,
classfileBuffer) {
10.       try {
11.          normalizedClassName = replaceAll(className, "/", ".")
12.          if FILTER_CLASSES contains normalizedClassName {
13.             classPool = getClassPool(loader)
14.             ctClass = classPool.get(className)
15.             for methodName in FILTER_METHODS {
16.                ctMethods = ctClass.getDeclaredMethods(methodName)
17.                for ctMethod in ctMethods {
18.                   enhanceMethod(ctMethod) // Inject interception and logging logic here
19.                }
20.             }
21.             return ctClass.toBytecode()
22.          }
23.       } catch Exception {
24.          // Handle exception
25.       }
26.       return classfileBuffer
27.    }

28.    function getClassPool(loader) {
29.       pool = ClassPool.getDefault()
30.       pool.appendClassPath(new LoaderClassPath(loader))
31.       return pool
32.    }
33. }
```

806
1  Socket[addr=redis.ACMEdev.us/123.123.12.2,port=443,localport=41313]
2  java.base/java.net.Socket.getOutputStream(Socket.java)
3  redis.clients.jedis.Connection.connect(Connection.java:203)
4  redis.clients.jedis.BinaryClient.connect(BinaryClient.java:101)
5  redis.clients.jedis.BinaryJedisCluster.<init>(BinaryJedisCluster.java:40)
6  redis.clients.jedis.JedisCluster.<init>(JedisCluster.java:87)
7  redis.clients.jedis.JedisCluster.<init>(JedisCluster.java)
8  org.springframework.data.redis.connection.jedis.JedisConnectionFactory.createCluster(JedisConnectionFactory.java)
...

810
101  Socket[addr=sqlserver.ACMEdev.us/124.178.1.2,port=1433,localport=51342]
102  java.base/java.net.Socket.getOutputStream(Socket.java)
103  com.microsoft.sqlserver.jdbc.TDSChannel.open(IOBuffer.java:672)
104  com.microsoft.sqlserver.jdbc.SQLServerConnection.connectHelper(SQLServerConnection.java:2435)
105  com.microsoft.sqlserver.jdbc.SQLServerConnection.login(SQLServerConnection.java:2087)
106  com.microsoft.sqlserver.jdbc.SQLServerConnection.connectInternal(SQLServerConnection.java:1958)
107  com.microsoft.sqlserver.jdbc.SQLServerConnection.connect(SQLServerConnection.java:1168)
...

804

808
1  redis.clients.jedis.Connection.prepareStatement → calling to redis.ACMEdev.us/123.123.12.2
...

IDENTIFYING APPLICATION AND TRANSPORT LAYERS DISCREPANCIES

FIELD

This disclosure generally relates to identifying requests from a software application to external systems, and, more specifically, to identifying application and transport layers discrepancies.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 6 is an example of pseudocode for dynamically instrumenting transport layer classes to intercept and log transport layer requests.

FIG. 7 is an example of pseudocode for dynamically instrumenting application services layer classes to intercept and log application services layer requests.

FIG. 8 illustrate an example of logs usable to identify un-instrumented code.

DETAILED DESCRIPTION

Figure 1:
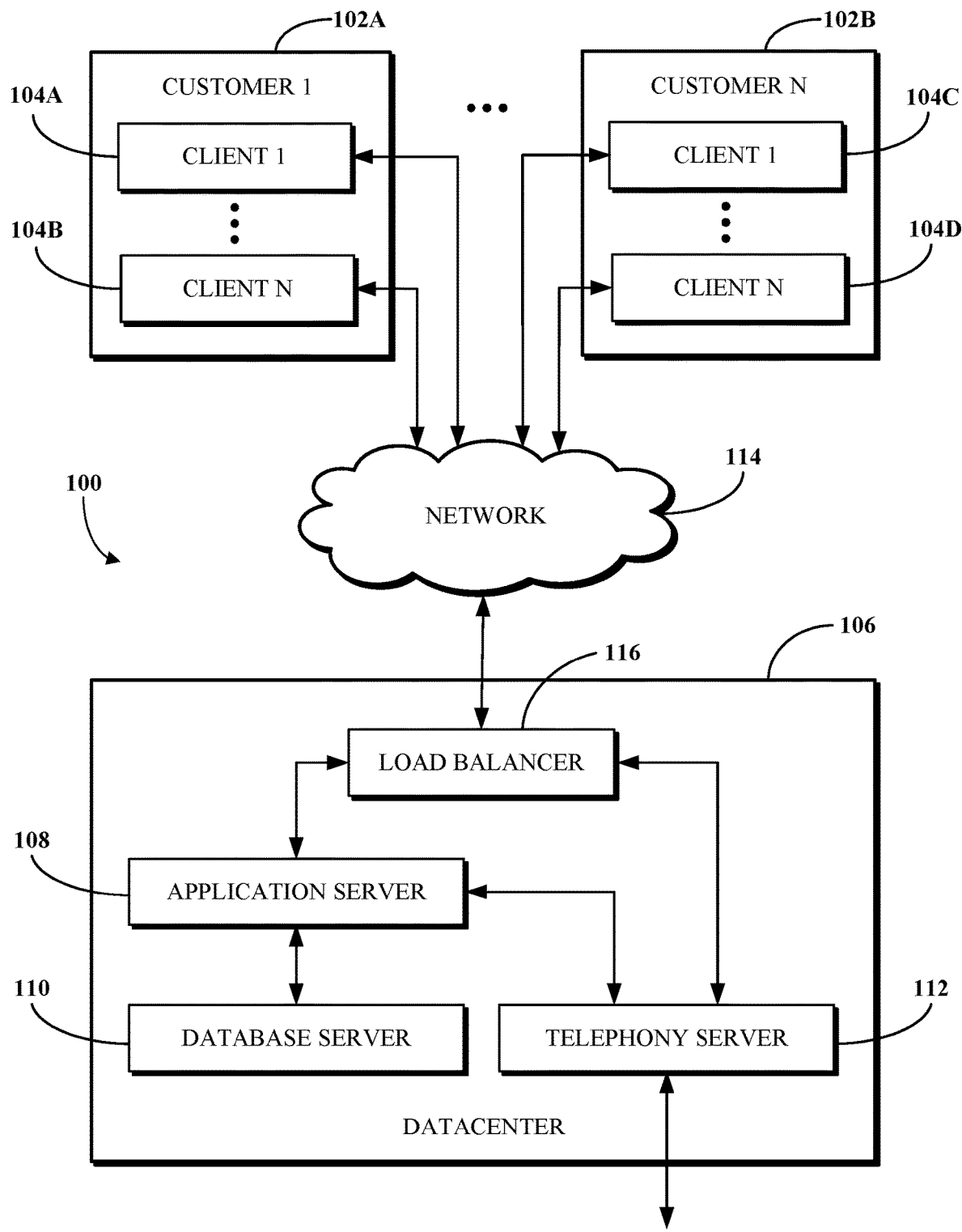
FIG. 1 is a block diagram of an example of an electronic computing and communications system.

Software platforms or applications, such as a unified communications as a service (UCaaS) platform or software thereof (e.g., conferencing software), are inherently complex, often comprising extensive codebases with potentially millions of lines of code, integration of third-party libraries, and dependencies on external systems such as databases event streaming platforms, or other applications. This complexity is heightened in environments with continuous integration and deployment, where code paths are dynamically introduced and modified and new libraries incorporated.

Software application code may be instrumented to support various use cases. Code instrumentation generally refers to the process of adding or integrating additional code into existing source code to collect data or manage aspects of execution. This can include, but is not limited to, gathering runtime data, performance monitoring, debugging, or tracking the flow of the program. Code instrumentation may be implemented by developers having access to the source code. However, in certain cases, a problem arises as to how to determine whether all code points that should be instrumented have in fact been instrumented. Additionally, especially with respect to classes where source code is not available, it may not be possible for developers to instrument such code.

Requests processed by the software application may result in requests being made to one or more external, backend systems. In the context of software testing, it may be necessary to ensure that the correct backend systems are being invoked and to ensure that the enhanced functionality is instrumented at all the points of the software where the functionality should be instrumented.

To elucidate further, consider a scenario in stress testing where test and production environments coexist. Traffic (e.g., incoming requests to the software application) may be differentiated through labeling-requests tagged with "test=1" might, for example, cause the software application to direct database requests to a test environment (e.g., a database dedicated to testing), while "test=0" would cause the software application to target a production environment (e.g., a database directed to supporting end user requests). If traffic were not properly segregated, such as due to label loss or incorrect propagation through the application of the label, undesirable issues, such as the unintentional mixing of test data with production data, may result.

Whereas there can be many paths through the code (e.g., logic) of the software application, when accessing external systems, there can be only a limited number of identifiable exist points from the software application. This code often uses various services to send requests to external systems through the a network (e.g., the internet). Software usually communicates with these external systems using a few standard network protocols, mainly Transmission Control Protocol (TCP) and the User Datagram Protocol (UDP) protocols. Recognizing this, the implementations of this disclosure address problems such as those described above by identifying discrepancies with software applications, specifically application and transport layer discrepancies.

Outgoing requests (e.g., to domains) from the transport layer are intercepted and requests from component clients are also intercepted. Domain refers to the address or fully qualified name of an external system; and a component client refers to application code in the business logic layer or a library in the application services layer that causes a transport layer request to be transmitted to a domain. By intercepting and logging outbound requests at the transport layer (utilizing TCP and UDP protocols) and similarly at other layers of the software application, a comparison of captured data from both layers can be used to identify discrepancies. Discrepancies in this context broadly means an identified request to an external system via the transport without that does not have a corresponding request from another layer in the software application. A discrepancy can be indicative of incomplete instrumentation. In a specific example, a discrepancy can be indicative of lost labels. The discrepancies can be used to identify un-instrumented points in the software application.

To restate, the dual-interception strategy described herein, employed at both the transport and application layers, enables validation of traffic flow and label propagation. Overlooked entry points or areas where label propagation fails can be identified. In an implementation, first data related to outbound transport layer requests from a software application to external systems are logged. Second data related to application services layer requests from the software application are also logged. A transport layer request that does not correspond to an application layer request is then identified based on the first data and the second data.

To describe some implementations in greater detail, reference is first made to examples of hardware and software structures used to implement a system for identifying application and transport layers discrepancies. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and/or to clients of a customer, such as the clients 104A through 104B for the customer 102A or the clients 104C through 104D for the customer 102B. For example, one or more of the clients 104A through 104D may be voice over internet protocol (VOIP)-enabled devices configured to send and receive calls over a network 114. The telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
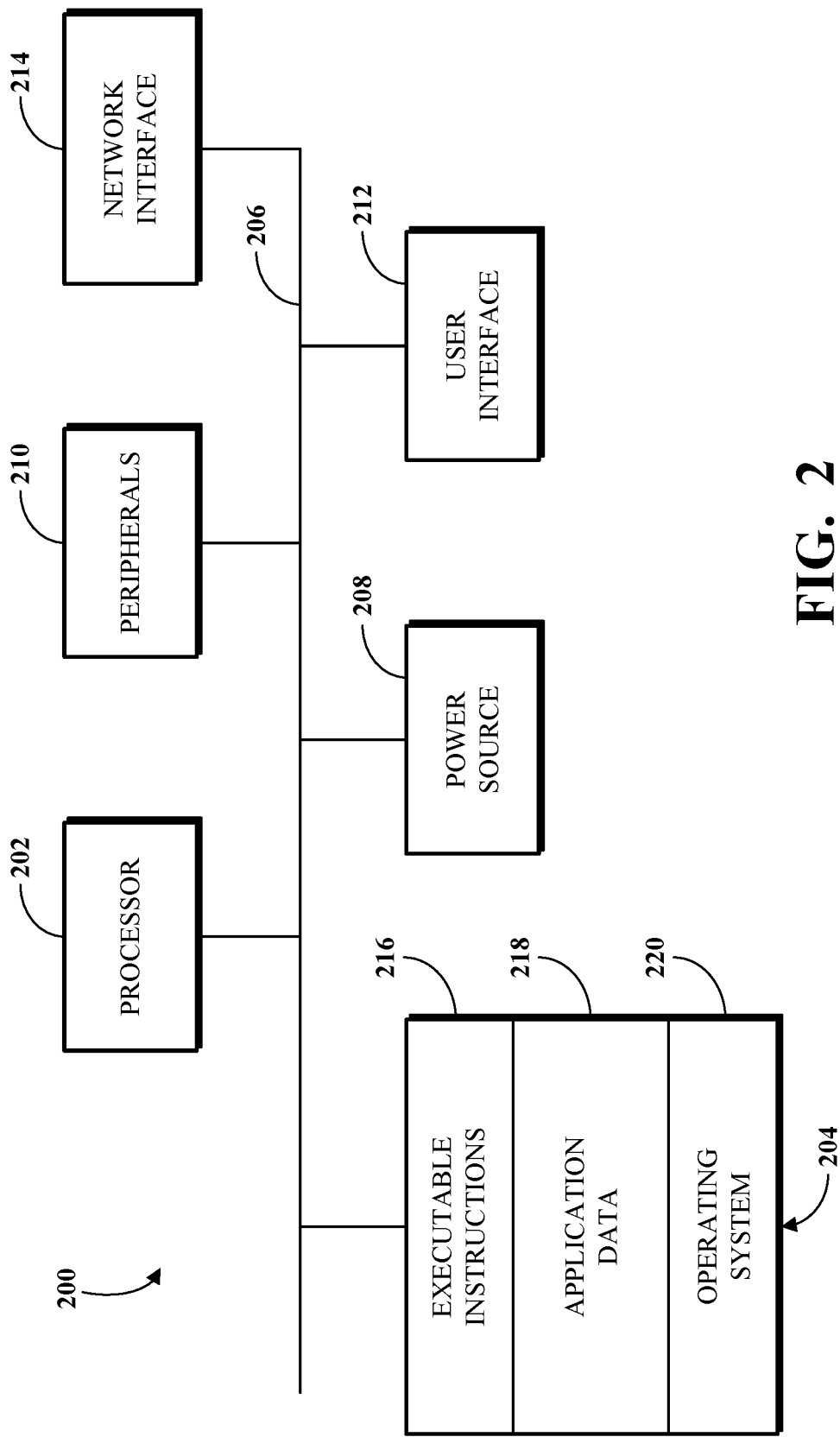
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, TCP, internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
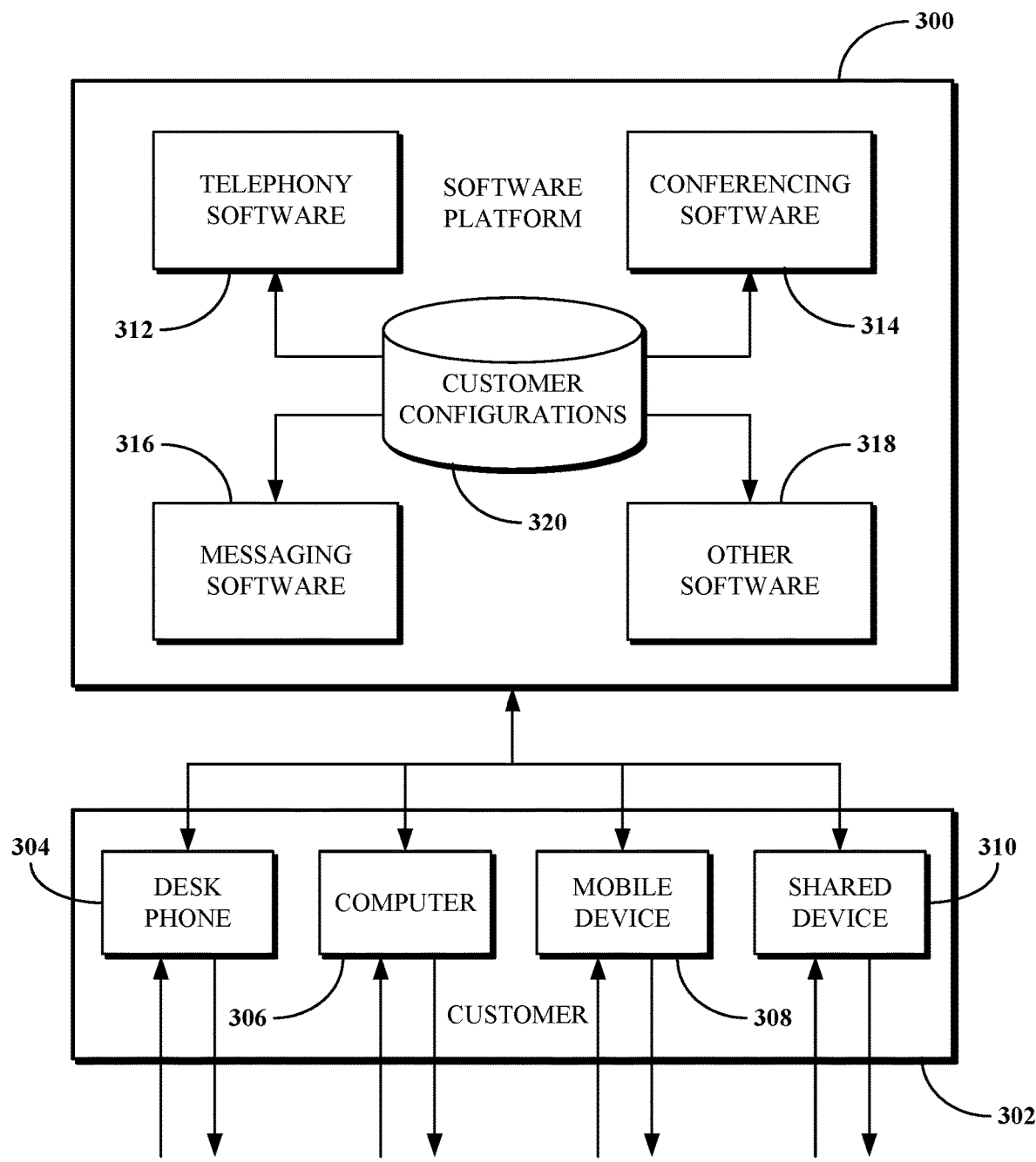
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients-a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for identifying application and transport layers discrepancies.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
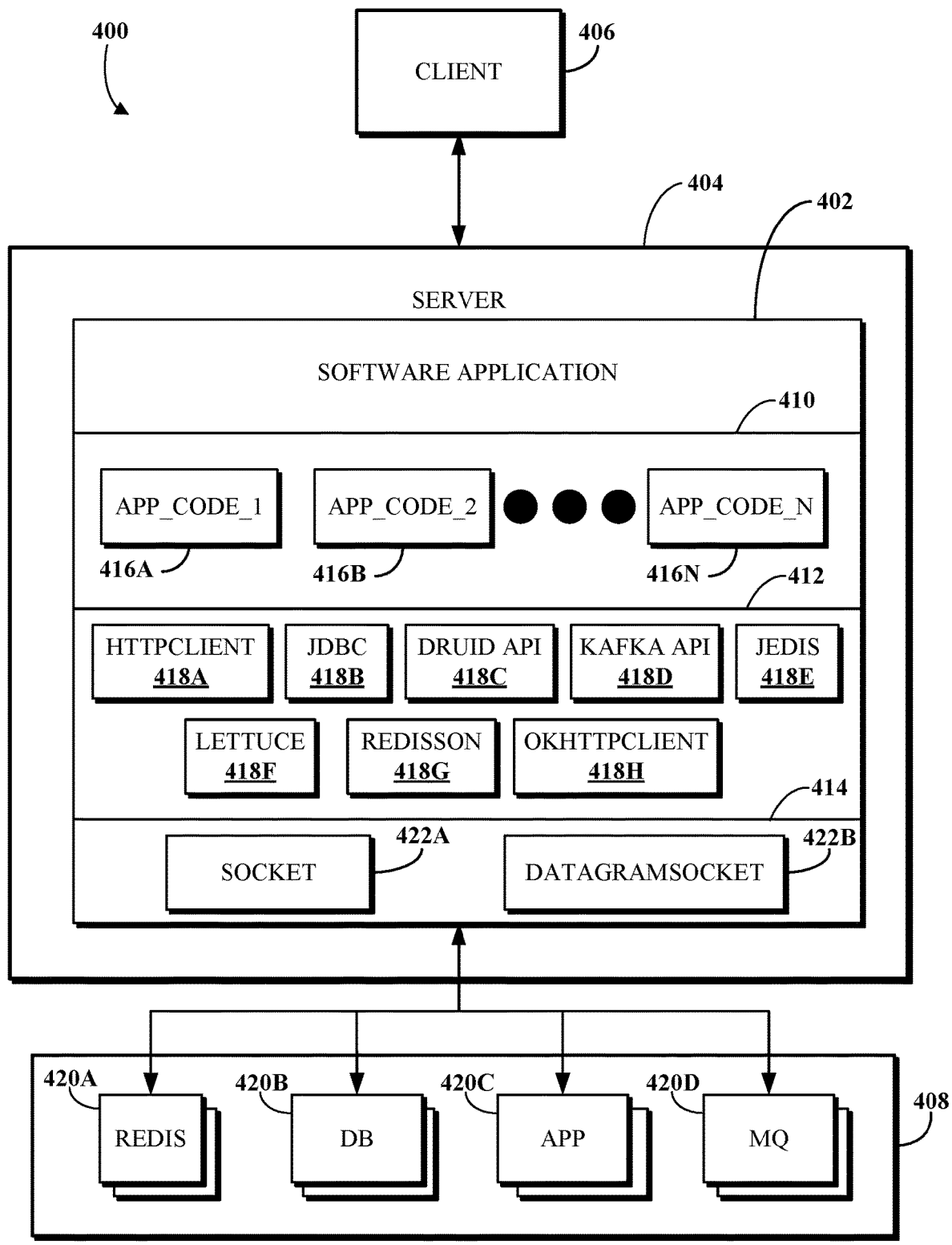
FIG. 4 is a block diagram of an example of a system where identifying application and transport layers discrepancies may be implemented.

FIG. 4 is a block diagram of an example of a system 400 where identifying application and transport layers discrepancies may be implemented. The system 400 includes a software application 402 that is deployed at or implemented by a server 404. The software application 402 can be the software platform 300 of FIG. 3 of can be one or more of the telephony software 312, the conferencing software 314, the messaging software 316, and the other software 318 therein. For simplicity of explanation, it is assumed herein that the software application 402 is written in the Java programming language. However, the implementations of this disclosure are not limited to that or any other particular language.

The software application 402 receives requests from clients, such as a client 406. The client 406 can be as described with respect to the computing device 200 of FIG. 2 or can be one of the clients 304 through 310 of FIG. 3. To process a request, the software application 402 may access systems external to the software application 402, such as one of external systems 408. Accessing an external system or application (e.g., of the external systems 408) includes that the software application 402 transmits requests over a network (not shown) to the external system or application. As can be appreciated, the software application 402 can be a distributed application that is implemented by more than one physical or virtual server. As such, the server 404 can be one or more physical or virtual servers.

The software application 402 may include a business logic layer 410, an application services layer 412, and a transport layer 414. The business logic layer 410 may include application-specific logic for handling (e.g., processing or responding to) requests received from clients, such as the client 406. The business logic layer 410 may include many classes, functions, routines, and the like (collectively referred to as "application code"), such as application code 416A through 416N.

The application services layer 412 can include (e.g., use or import) libraries (e.g., components) that provide high level services to the application code of the business logic layer 410 to interface with (e.g., to issue requests to) the external systems 408. The external systems 408 may include one of more instances of each of external systems 420A through 420D. Each of the libraries of the application services layer 412 includes a set of one or more application programming interfaces (APIs) usable by at least some of the application code 416A through 416N. For illustration purposes, the application services layer 412 is shown as including libraries 418A through 418H. However, the software application 402 may include more, fewer, or other components in the application services layer 412. A brief description of each of the libraries 418A-418H and external systems 420A-420D is now provided. However it is noted that the teachings herein are not limited to or by any particular application layer libraries or services or to or by any specific external systems.

The library 418A (e.g., HttpClient) is a software library for sending Hypertext Transfer Protocol (HTTP) requests and receiving responses, commonly used for interacting with web APIs and services over a network (e.g., the internet). The library 418A may be used to interface with the external system 420C. the library 418B (e.g., Java Database Connectivity (JDBC)) is a Java API that enables Java applications to interact with databases, such as the external systems 420A and 420B, allowing for executing Structured Query Language (SQL) statements, retrieving query results, and handling database connections. The external system 420B can be one or more of a RDBMS or an online analytical processing (OLAP) system, such as Druid. The library 418C (Druid API) provides a higher-level abstraction for interacting with Druid (the external system 420B) than the library 418B.

The library 418D (e.g., Kafka API) provides a set of interfaces to interact with the external system 420D. The external system 420D may be Kafka, which is a distributed streaming platform that is used for building real-time data pipelines and streaming applications, capable of handling high-throughput data feeds and complex event streams. The library 418E (e.g., Jedis) is a Java client usable for interacting with the external system 420A (e.g., Redis), which is an in-memory data structure store. The library 418F (e.g., Lettuce), which is also used to interface with the external system 420D, is an advanced and scalable Java Redis client that provides synchronous, asynchronous, and reactive APIs for communicating with Redis servers (e.g., the external system 420A). The library 418G (e.g., Redission) is yet another Redis Java client that offers additional features and functionalities over the libraries 418E and 418F, including distributed Java objects, services, and structures. The library 418H (e.g., OkHttpClient) is an efficient HTTP client that supports HTTP/2, spdy, and web socket connections, and is usable for interacting with, for example, the external system 420C.

As mentioned, the external system 420A (e.g., Redis) is an in-memory data structure store, often used as a database, cache, and message broker; the external system 420B can be a database, such as a MySQL, Druid, or some other database. MySQL is an open-source RDBMS that uses SQL for database access and operations. The external system 420C (e.g., App) can be an application that is accessible over the web using HTTP protocol, typically involving web services or APIs that can be interacted with via standard web requests. The external system 420D (e.g., a message queue) can be used for inter-process communication, or for inter-thread communication (e.g., within the same process), enabling asynchronous data exchange between different parts of a system.

Requests issued by application code in the business logic layer 410 to one of the external systems 408 via a component of the application services layer 412 are transmitted over the network by a component in the transport layer 414. The transport layer 414 may implement a limited number of communication protocols for network transmission. Or more accurately, the software application 402 (or the libraries 418A-418H) may use only a limited number of protocols implemented in the transport layer 414. The protocols used by the software application 402 may be TCP and UDP. An interface 422A (e.g., the Java class java.net. Socket) may implement the TCP protocol, and an interface 422B (e.g., the Java class java.net.DatagramSocket) may implement the UDP protocol.

Figure 5:
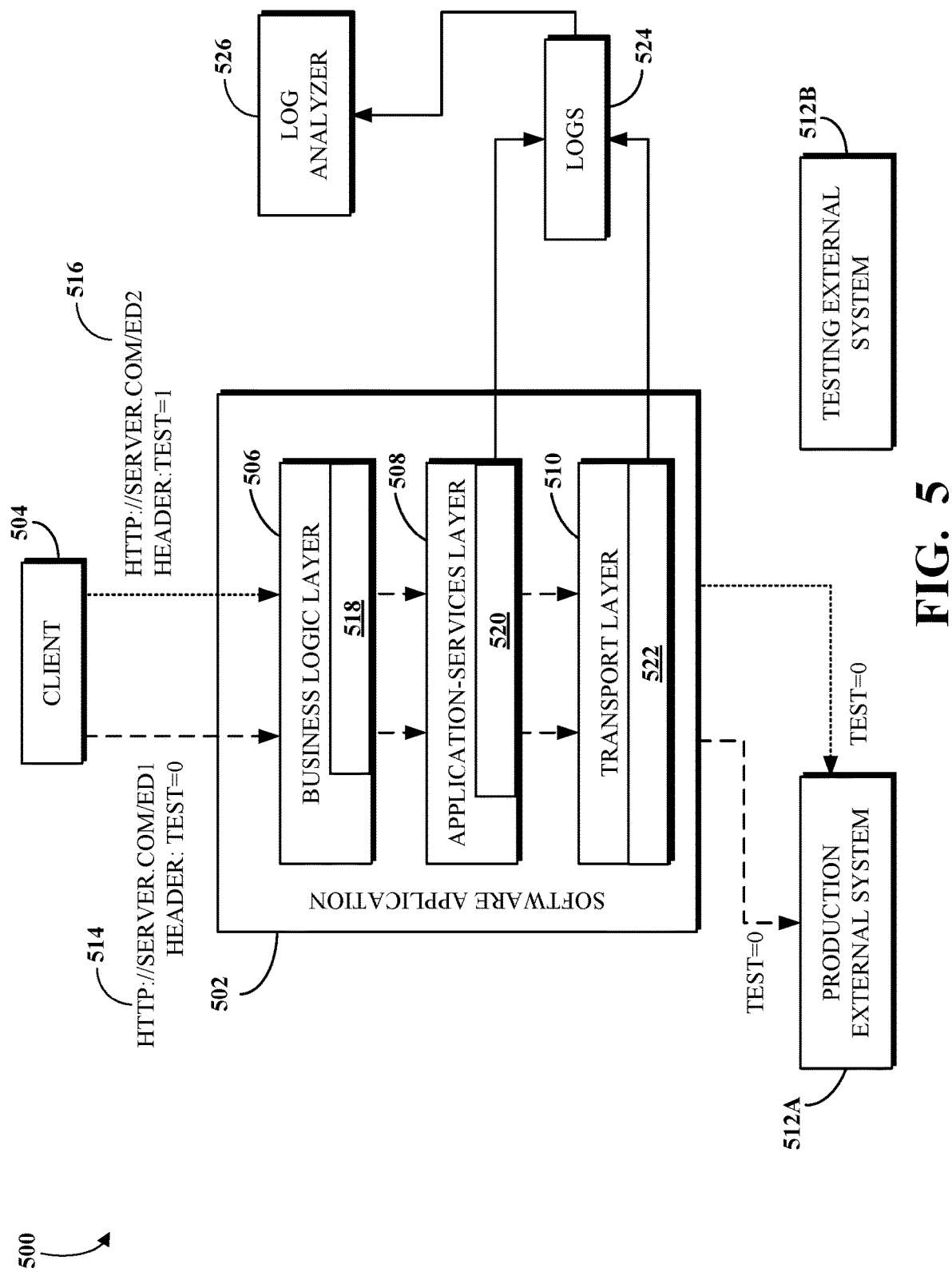
FIG. 5 is a block diagram of a system for using request interception to identify application and transport layer discrepancies.

FIG. 5 is a block diagram of a system 500 for using request interception to identify application and transport layer discrepancies. In an example, the discrepancies can be used to identify issues of lost labeling. The system 500 includes a software application 502, which can be the software application 402 of FIG. 4. The software application 502 receives requests from clients, such as a client 504, which can be the client 406 of FIG. 4. The software application 502 can include (e.g., can be architected to include) a business logic layer 506, an application services layer 508, and a transport layer 510, which can be as described with respect to the business logic layer 410, the application services layer 412, and the transport layer 414 of FIG. 4, respectively.

The system 500 is illustrated as further including two external systems 512A, 512B that may implement or provide the same services to the software application 502 but may be differentiated by their operational roles and/or environments. Specifically, external system 512B may be configured to handle (e.g., manage and process) requests exclusively during a testing phases of the software application 502. As such, the external system 512B may be or include a test database. On the other hand, the external system 512A may be configured to handle requests in a production environment, addressing real-time, end-user requests. The external system 512A can be or include a production database utilized for the actual deployment of the software application 502, handling live data and user interactions. This bifurcation ensures that testing activities do not interfere with the live, production environment and that test data does not contaminate the production data.

The software application 502 receives a first request 514 and a second request 516 from the client 504. The first request 514 may be issued by an end-user and is, as such, a production request and the second request 516 is received during a testing phase. Requests to the software application 502 may include a parameter (e.g., "TEST") whose value indicates whether the request is a production or a test request. As illustrated, and without limitations, if TEST=0, then the request is a production request; and if TEST=1, then the request is a test request. In an example, if a request does not include the TEST parameter, then the software application may infer that the request is a production request (i.e., TEST=0).

FIG. 5 illustrates that, while processing the second request 516 through the business logic layer 506 or the application services layer 508, the request becomes at some point no longer considered to be test request. That is, the request is no longer associated with the label TEST=1. Any number of reasons may cause the label to not be propagated through the software application 502. To illustrate, and without limitations, a new thread may be instantiated for the second request 516 but the label is not propagated (e.g., copied) to the new thread.

Because of the lost label, the software application 502 causes requests to the transmitted to the external system 512A (e.g., the production system) in association with both the first request 514 and the second request 516, which is not desirable. That a label is lost or is not propagated can mean that certain application code in the business logic layer 506 or a library in the application services layer 508 is not properly configured (e.g., instrumented or coded) to perform different processing based on the label.

Enhancement code 518 of the business logic layer 506 and/or enhancement code 520 of the application services layer 508 may be configured to provide different processing based on the label. To illustrate, enhancement code in a library (e.g., the library 418B) of the libraries 418A through 418H of FIG. 4 may cause the library to transmit requests to one of the external system 512A or the external system 512B based on the value of the parameter TEST. The enhancement code may be injected into the library at runtime via bytecode modification.

The enhancement code 518 and the enhancement code 520 are shown as not spanning the entireties of the business logic layer 506 and the application services layer 508, respectively, to indicate that at least some application code or library are not properly instrumented to perform the special processing.

To aid in identifying the libraries and/or functions therein of the application services layer 508 that are not or are not properly instrumented, the enhancement code 520 can be further instrumented (as described with respect to FIG. 7) to log to logs 524 requests from the libraries to external systems, and the transport layer 510 can also be instrumented (as described with respect to FIG. 6) with a logging layer 522 so that requests sent from the transport layer to the external systems are also logged to the logs 524. The logs 524 can be one or more logs.

A log analyzer 526 analyzes (e.g., reconciles) the logs 524 (generated by the enhancement code 520 and logging layer 522) to aid in identifying un-instrumented libraries therewith resulting in lost labels. An example of the logs 524 and the operations of the log analyzer are described with respect to FIG. 8.

FIG. 6 is an example of pseudocode 600 for dynamically instrumenting transport layer classes to intercept and log transport layer requests. The pseudocode 600 performs bytecode instrumentation in a Java application. Custom behavior can be injected into existing classes without altering their source code. The injected custom behavior, in this case, can be the interception and logging (such as to the logs 524 of FIG. 5) of transport layer requests to external systems (such as to the external systems 408 of FIG. 4), as described above.

The instrumented classes in the pseudocode 600 particularly focus on network-related classes: classes java.net. Socket and java.net.DatagramSocket, as shown at line 7.

Two primary classes are described: PressAgent (lines 1-5) and PressClassFile Transformer (lines 6-36).

In the PressAgent class (lines 1-5), the function premain is defined. The function premain is a standard entry point for Java agents, invoked before the main( ) function of the application (line 2). Within premain, an instance of PressClassFile Transformer is created and registered with the Java Instrumentation interface (line 3). This registration enables the PressClassFile Transformer to intercept and modify the bytecode of classes during their loading phase by the JVM.

The PressClassFile Transformer class (lines 6-36) implements the ClassFile Transformer interface, usable for modifying class bytecodes. PressClassFile Transformer maintains a list of target classes (FILTER_CLASSES at line 7) for transformation, specifically java.net. Socket and java.net.DatagramSocket (lines 6-7). PressClassFile Transformer also defines constants for function names (FILTER_METHOD_SOCKET and FILTER_METHOD_DATAGRAMSOCKET) within these classes that are of interest for instrumentation (lines 8-9).

The functions selected for instrumentation (e.g., getOutputStream and send) are those considered to be funnel (e.g., central) points through which all outbound requests are sent to external systems.

The transform function (lines 10-28) is automatically invoked for every class loaded by the JVM. The transform function checks if the class being loaded matches any in the FILTER_CLASSES list (lines 14-15). If a match is found, the function proceeds to retrieve and modify the specified functions in these classes, adding custom bytecode at the start of these functions (lines 17-26). This process involves the creation and manipulation of ClassPool and CtClass objects for bytecode modification (lines 17-18, 20-26).

The function getClassPool (lines 31-35) is a utility function within the PressClassFile Transformer class. It initializes and returns a ClassPool instance, which is usable for accessing and modifying the bytecode of classes (line 32). The ClassPool is configured with a LoaderClassPath that is associated with the class loader of the class being transformed, ensuring that the class transformation is contextually accurate (line 33).

At lines 18 and 24, code that implements the interception and logging of requests can be added (e.g., injected). In an example, and while not specifically shown, the logging code can include outputting a domain of the external system and outputting a stack trace to a log, such as the logs 524 of FIG. 5. The specifics of the injected code at lines 18 and 24 are not necessary for the understanding of this disclosure and are, therefore, omitted.

FIG. 7 is an example of pseudocode 700 for dynamically instrumenting application services layer classes to intercept and log application services layer requests. As mentioned above, bytecode instrumentation enables for the dynamic modification of classes at runtime so that custom behavior can be injected into existing classes without altering their source code, thereby providing a way to intercept and log, in this case, application services layer requests to external systems.

The pseudocode 7000 specifically instruments functions in the application services layer 412 of FIG. 4 targeting database connection and statement classes from the Druid library com.acme.druid.pool.DruidPooledConnection, which may be included in the library 418C. Via the instrumentation, the instrumented classes or functions can implement enhanced, additional functionalities, such as interception and logging of requests.

The functions targeted for instrumentation, in this example, are prepare Statement and prepareCall (line 8) because they play critical roles in database operations. PrepareStatement and prepareCall are fundamental functions used in JDBC for executing SQL queries and calling stored procedures, respectively. As such, instrumenting these functions enables the tracking and logging of database interactions.

The PressAgent class (lines 1-5) incorporates a premain function (lines 2-4), which can be as described above with respect to FIG. 6, registers a transformation class, PressClassFile Transformer, which implements functionality similar to that described above. The PressClassFile Transformer class (lines 6-33) implements the ClassFile Transformer interface and specifies target classes (FILTER_CLASSES, lines 7) and functions (FILTER_METHODS, lines 8) for transformation. The primary functionality is encapsulated in the transform method (lines 9-27). This method is invoked automatically for every class loaded by the JVM. When the class being loaded matches one of the FILTER_CLASSES (lines 11-12), the transformer modifies specified methods (FILTER_METHODS) in the class using the enhanceMethod function (lines 15-18). This function injects custom bytecode, such as logging logic, into the beginning of each targeted function.

The getClassPool function (lines 28-32) provides a ClassPool object that facilitates access to and modification of class bytecodes. The ClassPool is configured with the class loader's class path (line 30), ensuring contextual accuracy during transformation.

At line 18, code that implements the interception and logging of requests can be added. In an example, and while not specifically shown, the logging code can include outputting data related to requests being processed through these functions. In an example, the data related to a request can include a domain of the external system. The data can be output to a log, such as the logs 524 of FIG. 5. The specifics of the injected code at line 18 are not necessary for the understanding of this disclosure and are, therefore, omitted.

FIG. 8 illustrate an example 800 of logs usable to identify un-instrumented code. The logs can be the logs 524 of FIG. 5. The example 800 includes a log 802 of stack traces generated (e.g., output) by classes of a transport layer, and a log 804 that includes data related to calls generated from an application services layer. The logs of the example 800 can be analyzed by a log analyzer, such as the log analyzer 526 of FIG. 5.

In the log 802, a stack trace 806 (e.g., lines 1-8) is output from a call to Socket.getOutputStream initiating from the application services layer JEDIS library (e.g., the library 418E). The call is to the domain "redis.ACMEdev.us" at IP address "123.123.12.2." The log 804 includes a corresponding log entry 808 generated by the function prepareStatement in the JEDIS library. The log analyzer determines that the stack trace 806 and the log entry 808 correspond at least because they are both issuing requests to the same domain (e.g., redis.ACMEdev.us/123.123.12.2).

On the other hand, while the log 802 includes a stack trace that includes a call initiating from the class com.microsoft.sqlserver.jdbc, which may be included in the library 418B of FIG. 4, the log analyzer determines that the log 804 does not include a corresponding log entry. As such, the log analyzer can output a message indicating that the library 418B may not be properly instrumented therewith potentially resulting in lost traffic labels.

In an example, the log analyzer can identify a list of all domains found in the log 802 and a list of all domains found in the log 804 and identify differences therebetween. A domain found in the log 802 but not found in the log 804 can be indicative of a library of the application services layer that is not properly instrumented to propagate traffic labels. However, it is noted that just because a domain may exist in both of the logs 802 and 804 may not necessarily mean that all libraries that communicate with an external system available at a domain have been correctly instrumented. To illustrate, and as described above with respect to FIG. 4, all of the libraries 418E, 418F, and 418G can be used to communicate with the external system 420A. As such, if only one of the libraries 418E, 418F, and 418G is instrumented then the domain of the external system 420A will be found in the log entry 808. In such cases, the stack traces can be helpful in identifying which libraries are not instrumented therewith resulting in lost traffic labels.

In an example, the log analyzer may identify all libraries of the software application and output a report indicating which of the libraries are not identified in any stack traces of the log 802. In an example, the log analyzer may identify the libraries by scanning the code of the software application. For example, the log analyzer may identify "import" Java statements indicative of libraries used by the software application. In an example, the log analyzer may identify the libraries by scanning the runtime environment of the software application, which may be defined by a classpath setting. In an example, the log analyzer may be configured with a list of the libraries.

Figure 9:
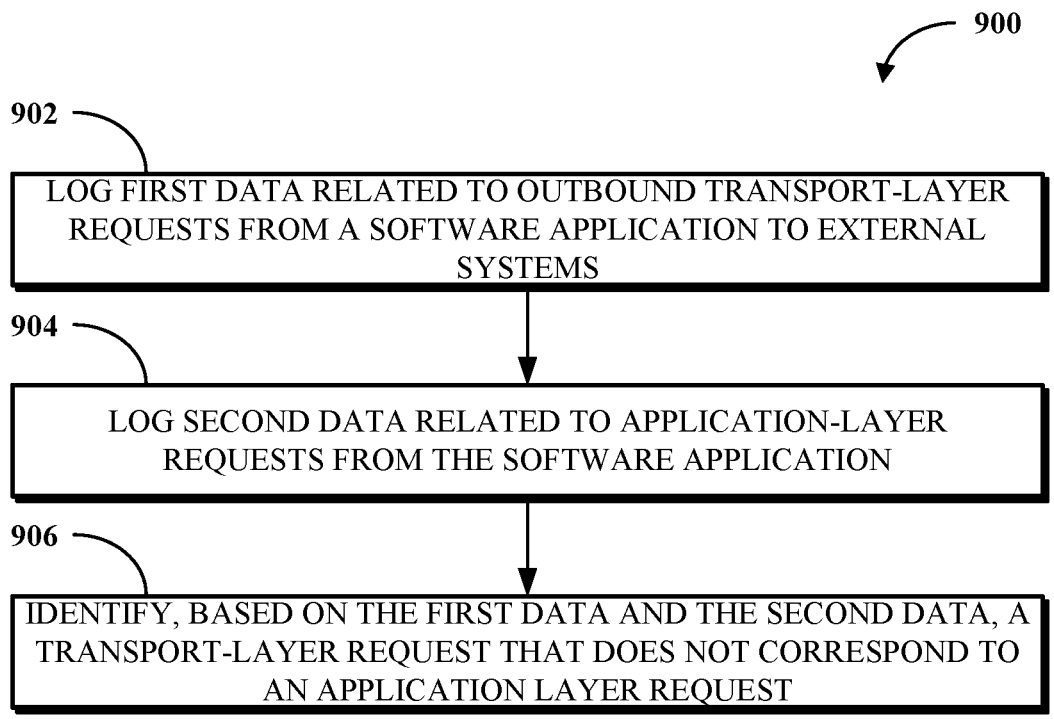
FIG. 9 is a flowchart of an example of a technique for identifying application and transport layers discrepancies.

To further describe some implementations in greater detail, reference is next made to examples of techniques which may be performed by or using a system for identifying application and transport layers discrepancies. FIG. 9 is a flowchart of an example of a technique 900 for identifying application and transport layers discrepancies. The technique 900 can be executed using computing devices, such as the systems, hardware, and software described with respect to FIGS. 1-8. The technique 900 can be performed, for example, by executing a machine-readable program or other computer-executable instructions, such as routines, instructions, programs, or other code. The steps, or operations, of the technique 900, or another technique, method, process, or algorithm described in connection with the implementations disclosed herein can be implemented directly in hardware, firmware, software executed by hardware, circuitry, or a combination thereof.

For simplicity of explanation, the technique 900 is depicted and described herein as a series of steps or operations. However, the steps or operations of the technique 900 in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 902, first data related to outbound transport-layer requests from a software application to external systems are logged. Logging can mean outputting and/or writing to a log file. Logging the first data can include logging respective stack traces associated with the transport-layer requests. The outbound transport-layer requests can utilize one of TCP or UDP. The first data can include respective domain names of the external systems. Logging the first data can be performed by an agent injected into classes java.net.Socket and java.net.DatagramSocket executable by the software application. The technique 900 can include configuring a premain function to modify respective bytecode of classes related to network communication to enable logging the first data, wherein the classes related to the network communication comprise java.net. Socket and java.net.DatagramSocket.

At 904, second data related to application-layer requests from the software application are logged. Logging the second data can include logging data related to a first access mechanism by the software application to a database; and logging data related to a second access mechanism by the software application to the database. An access mechanism can be a library, such as a library of the application services layer of the software application. For example, the first access mechanism and the second access mechanism can be the library 418B and the library 418C, respectively.

At 906, a transport-layer request that does not correspond to an application layer request is identified based on the first data and the second data. The first data and the second data can be analyzed to identify instances of lost traffic labeling. In an example, the first data and the second data can be analyzed to identify domain names not included in the second data. For example, that a domain name is not included in the second data can be used to identify the library that is not instrumented. To illustrate, if the domain of the external systems 420A of FIG. 4 is not included in the second data, then one (e.g., a developer or a test engineer) can conclude that the library 418D is not properly instrumented. In another example, a mapping may exist between the libraries and the domains. Accordingly, the technique 900 can use the mapping to identify the libraries that are not properly instrumented.

The disclosure presented herein may be considered in view of the following clauses.

Example Clause A: A method that includes: logging first data related to outbound transport layer requests from a software application to external systems; logging second data related to application services layer requests from the software application to at least some of the external systems; and identifying, based on the first data and the second data, a transport layer request of the outbound transport layer requests that does not correspond to an application services layer request of the application services layer requests.

Example Clause B: The method of Example Clause A, where logging the first data related to the outbound transport layer requests from the software application to the external systems includes: logging respective stack traces associated with the outbound transport layer requests.

Example Clause C: The method of Example Clause A or Example Clause B, where the outbound transport layer requests utilize a Transmission Control Protocol (TCP) or a User Datagram Protocol (UDP).

Example Clause D: The method of any one of Example Clauses A-C, where the first data include respective domain names of the external systems.

Example Clause E: The method of any one of Example Clauses A-D, where logging the first data is performed by an agent injected into classes including java.net. Socket and java.net. Datagram Socket executable by the software application.

Example Clause F: The method of any one of Example Clauses A-E, further including: configuring a premain function to modify respective bytecode of classes related to network communication to enable logging the first data, where the classes related to the network communication include java.net. Socket and java.net.DatagramSocket.

Example Clause G: The method of any one of Example Clauses A-F, where logging the second data related to the application services layer requests from the software application includes: logging data related to a first access mechanism by the software application to a database; and logging data related to a second access mechanism by the software application to the database.

Example Clause H: The method of any one of Example Clauses A-G, further including: identifying instances of lost traffic labeling based on the first data and the second data.

Example Clause I: The method of any one of Example Clauses A-H, further including: identifying, based on the first data, domain names not included in the second data.

Example Clause J: The method of any one of Example Clauses A-I, where the first data includes stack traces.

Example Clause K: A system that includes one or more memories and one or more processors. The one or more processors is configured to execute instructions stored in the one or more memories to: log first data related to outbound transport layer requests from a software application to external systems; log second data related to application services layer requests from the software application to at least some of the external systems; and identify, based on the first data and the second data, a transport layer request of the outbound transport layer requests that does not correspond to an application services layer request of the application services layer requests.

Example Clause L: The system of Example Clause K, where the one or more processors is configured to execute instructions stored in the one or more memories to: configure a premain function to modify respective bytecode of classes related to network communication to enable logging the first data.

Example Clause M: The system of Example Clause K or Example Clause L, where the one or more processors is configured to execute instructions stored in the one or more memories to: modify byte code of at least one library of an application services layer to log at least some of the second data.

Example Clause N: The system of any one of Example Clauses K-M, where the one or more processors is configured to execute instructions stored in the one or more memories to: identify first domains included in the first data; identify second domains included in the second data; and output a list of domain names included in the first domains but not included in the second domains.

Example Clause O: The system of any one of Example Clauses K-N, where the first data include stack traces.

Example Clause P: Non-transitory computer readable media storing instructions operable to cause one or more processors to perform operations including: logging first data related to outbound transport layer requests from a software application to external systems; logging second data related to application services layer requests from the software application to at least some of the external systems; and identifying, based on the first data and the second data, a transport layer request of the outbound transport layer requests that does not correspond to an application services layer request of the application services layer requests.

Example Clause Q: The non-transitory computer readable media of Example Clause P, where the operations include: configuring classes related to network communication to enable logging the first data.

Example Clause R: The non-transitory computer readable media of Example Clause P or Example Clause Q, where the operations include: modifying at least one library of the application services layer to log at least some of the second data.

Example Clause S: The non-transitory computer readable media of any one of Example Clauses P-R, where the first data and the second data are used to identify a discrepancy in domain names between the first data and the second data.

Example Clause T: The non-transitory computer readable media of any one of Example Clauses P-S, where the first data include stack traces.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
    logging first data related to outbound transport layer requests from a software application to external systems;
    logging second data related to application services layer requests from the software application to at least some of the external systems;
    identifying, based on the first data and the second data, an outbound transport layer request of the outbound transport layer requests that does not correspond to an application services layer request of the application services layer requests; and
    configuring a premain function to modify respective bytecode of classes related to network communication to enable logging the first data, wherein the classes related to the network communication comprise java.net.Socket and java.net.Datagram.Socket.

2. The method of claim 1, wherein logging the first data related to the outbound transport layer requests from the software application to the external systems comprises:
    logging respective stack traces associated with the outbound transport layer requests.

3. The method of claim 1, wherein the outbound transport layer requests utilize a Transmission Control Protocol (TCP) or a User Datagram Protocol (UDP).

4. The method of claim 1, wherein the first data include respective domain names of the external systems.

5. The method of claim 1, wherein logging the first data is performed by an agent injected into classes comprising java.net.Socket and java.net.Datagram.Socket executable by the software application.

6. The method of claim 1, wherein logging the second data related to the application services layer requests from the software application comprises:
    logging data related to a first access mechanism by the software application to a database; and
    logging data related to a second access mechanism by the software application to the database.

7. The method of claim 1, further comprising:
    identifying instances of lost traffic labeling based on the first data and the second data.

8. The method of claim 1, further comprising:
    identifying, based on the first data, domain names not included in the second data.

9. The method of claim 1, wherein the first data comprises stack traces.

10. A system, comprising:
    one or more memories; and
    one or more processors, the one or more processors configured to execute functions stored in the one or more memories to:
        log first data related to outbound transport layer requests from a software application to external systems;
        log second data related to application services layer requests from the software application to at least some of the external systems;

identify, based on the first data and the second data, an outbound transport layer request of the outbound transport layer requests that does not correspond to an application services layer request of the application services layer requests; and configure a premain function to modify respective bytecode of classes related to network communication to enable logging the first data, wherein the classes related to the network communication comprise java.net.Socket and java.net.Datagram.Socket.

11. The system of claim 10, wherein the one or more processors is configured to execute instructions stored in the one or more memories to:

modify byte code of at least one library of an application services layer to log at least some of the second data.

12. The system of claim 10, wherein the one or more processors is configured to execute instructions stored in the one or more memories to:

identify first domains included in the first data;
identify second domains included in the second data; and
output a list of domain names included in the first domains but not included in the second domains.

13. The system of claim 10, wherein the first data comprise stack traces.

14. Non-transitory computer readable media storing instructions operable to cause one or more processors to perform operations comprising:

logging first data related to outbound transport layer requests from a software application to external systems;

logging second data related to application services layer requests from the software application to at least some of the external systems;

identifying, based on the first data and the second data, an outbound transport layer request of the outbound transport layer requests that does not correspond to an application services layer request of the application services layer requests; and configuring a premain function to modify respective bytecode of classes related to network communication to enable logging the first data, wherein the classes related to the network communication comprise java.net.Socket and java.net.Datagram.Socket.

15. The non-transitory computer readable media of claim 14, wherein the operations comprise:

configuring classes related to network communication to enable logging the first data.

16. The non-transitory computer readable media of claim 14, wherein the operations comprise:

modifying at least one library of the application services layer to log at least some of the second data.

17. The non-transitory computer readable media of claim 14, wherein the first data and the second data are used to identify a discrepancy in domain names between the first data and the second data.

18. The non-transitory computer readable media of claim 14, wherein the first data comprise stack traces.

* * * * *